United States Patent
Kennedy et al.

(10) Patent No.: US 11,459,970 B2
(45) Date of Patent: Oct. 4, 2022

(54) FUEL LEAK DETECTION SYSTEM

(71) Applicant: Caterpillar Inc., Peoria, IL (US)

(72) Inventors: Joseph L. Kennedy, Zionsville, IN (US); Dereck G. Heffron, Peoria, IL (US); Ryan M. Hinrichsen, Groveland, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/184,095

(22) Filed: Feb. 24, 2021

(65) Prior Publication Data

US 2022/0268233 A1    Aug. 25, 2022

(51) Int. Cl.
*F02D 41/22* (2006.01)
*B60Q 9/00* (2006.01)
*G07C 5/08* (2006.01)

(52) U.S. Cl.
CPC .............. *F02D 41/22* (2013.01); *B60Q 9/00* (2013.01); *G07C 5/0808* (2013.01); *G07C 5/0816* (2013.01); *F02D 2041/225* (2013.01); *F02D 2200/0602* (2013.01); *F02D 2200/101* (2013.01)

(58) Field of Classification Search
CPC .............. F02D 41/22; F02D 2041/225; F02D 2200/0602; F02D 2200/101; B60Q 9/00; G07C 5/0808; G07C 5/0816
See application file for complete search history.

(56) References Cited

U.S. PATENT DOCUMENTS

| | | | |
|---|---|---|---|
| 9,624,873 B2* | 4/2017 | Bleyer | F02M 61/167 |
| 2003/0172720 A1 | 9/2003 | Sweetland et al. | |
| 2005/0263146 A1* | 12/2005 | Oono | F02D 41/222 123/690 |
| 2014/0238352 A1 | 8/2014 | Methil et al. | |
| 2015/0159574 A1* | 6/2015 | Stack | G01M 15/09 73/1.57 |
| 2017/0067407 A1* | 3/2017 | Dudar | F02D 41/3005 |
| 2019/0040812 A1 | 2/2019 | Sarwar et al. | |

FOREIGN PATENT DOCUMENTS

| | | |
|---|---|---|
| DE | 196 22 757 A1 | 5/1997 |
| WO | 2010/111747 A1 | 10/2010 |

* cited by examiner

*Primary Examiner* — George C Jin
(74) *Attorney, Agent, or Firm* — Bookoff McAndrews, PLLC

(57) ABSTRACT

Fuel leak detection systems and methods are disclosed. A method for detecting a fuel leak for a fuel system of an engine includes detecting a ramp up of the engine. The method includes measuring rail pressure of a fuel rail during the ramp up. The method also includes determining a fuel leak exists in the fuel system based on the measured rail pressure during the ramp up. In accordance with a determination that a fuel leak exists, the method includes outputting an indication of the fuel leak in the fuel system.

18 Claims, 3 Drawing Sheets

FUEL LEAK DETECTION SYSTEM

TECHNICAL FIELD

The present disclosure relates generally to fuel systems in internal combustion engines, and more particularly, to a fuel leak detection system for such fuel systems.

BACKGROUND

Fuel systems for internal combustion engines, such as high pressure fuel systems, may develop leaks over time due to various causes. For example, mechanical joints in a fuel line of the fuel system may wear and fuel may leak past the joint. Such fuel systems may be designed to pump fuel to a common fuel rail such that a rail pressure is maintained at a desired rail pressure. This ensures the fuel rail is adequately pressurized for a given demand of the engine as the fuel is injected from the rail to the cylinders via one or more injectors. However, the life of the pump may decrease and the pump may eventually fail due to cavitation damage accumulating because of the pump having to pump more fuel when there is a leak in the fuel system to meet the demand of the engine. Current leak detection methods may only detect relatively large leaks such that the engine needs to be de-rated by the time the leak is detected. Accordingly, current leak detection methods may not adequately detect moderate or relatively small leaks and/or may falsely diagnose a leak in the fuel system.

U.S. Patent Application Publication No. 2014/0238352, published on Aug. 28, 2014 ("the '352 publication"), describes an electronic controller for a common rail fuel system that detects a fault, such as leaks, when a time sum accumulated error exceeds a threshold. The time sum accumulated error is left unchanged when the operating condition is transient (e.g., during ramp up), and either adds or subtracts from the time sum accumulated error responsive to a rail pressure error and the operating condition being steady state. For example, the time sum accumulated error is added to or subtracted from based on a magnitude that the rail pressure is greater than or less than a desired rail pressure during steady state. However, the '352 publication may not adequately detect fuel leaks in fuel systems that recirculate leaked fuel and/or for moderate or relatively small leaks.

The fuel leak detection system of the present disclosure may solve one or more of the problems set forth above and/or other problems in the art. The scope of the current disclosure, however, is defined by the attached claims, and not by the ability to solve any specific problem.

SUMMARY

In one aspect, a method for detecting a fuel leak for a fuel system of an engine is disclosed. The method includes: detecting a ramp up of the engine; measuring rail pressure of a fuel rail during the ramp up; determining a fuel leak exists in the fuel system based on the measured rail pressure during the ramp up; and in accordance with a determination that a fuel leak exists, outputting an indication of the fuel leak in the fuel system.

In another aspect, a fuel leak detection system is disclosed. The system includes: a fuel system of an engine including a fuel rail; a sensor for measuring a rail pressure of the fuel rail; and a controller configured to: detect a ramp up of the engine; measure the rail pressure of the fuel rail during the ramp up; determine a fuel leak exists in the fuel system based on the measured rail pressure during the ramp up; and in accordance with a determination that a fuel leak exists, outputting an indication of the fuel leak in the fuel system.

In yet another aspect, a method for detecting a fuel leak for a fuel system of an engine is disclosed. The method includes: detecting a ramp up of the engine when a rail pressure of a fuel rail exceeds a threshold from an idle condition; measuring rail pressure of the fuel rail during the ramp up; comparing the measured rail pressure during the ramp up to a desired rail pressure; determining whether a difference between the measured rail pressure and the desired rail pressure is greater than a threshold; in accordance with a determination that the difference is greater than the threshold, determining a fuel leak in the fuel system exists; and outputting an indication of the fuel leak in the fuel system

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value.

Figure 1:
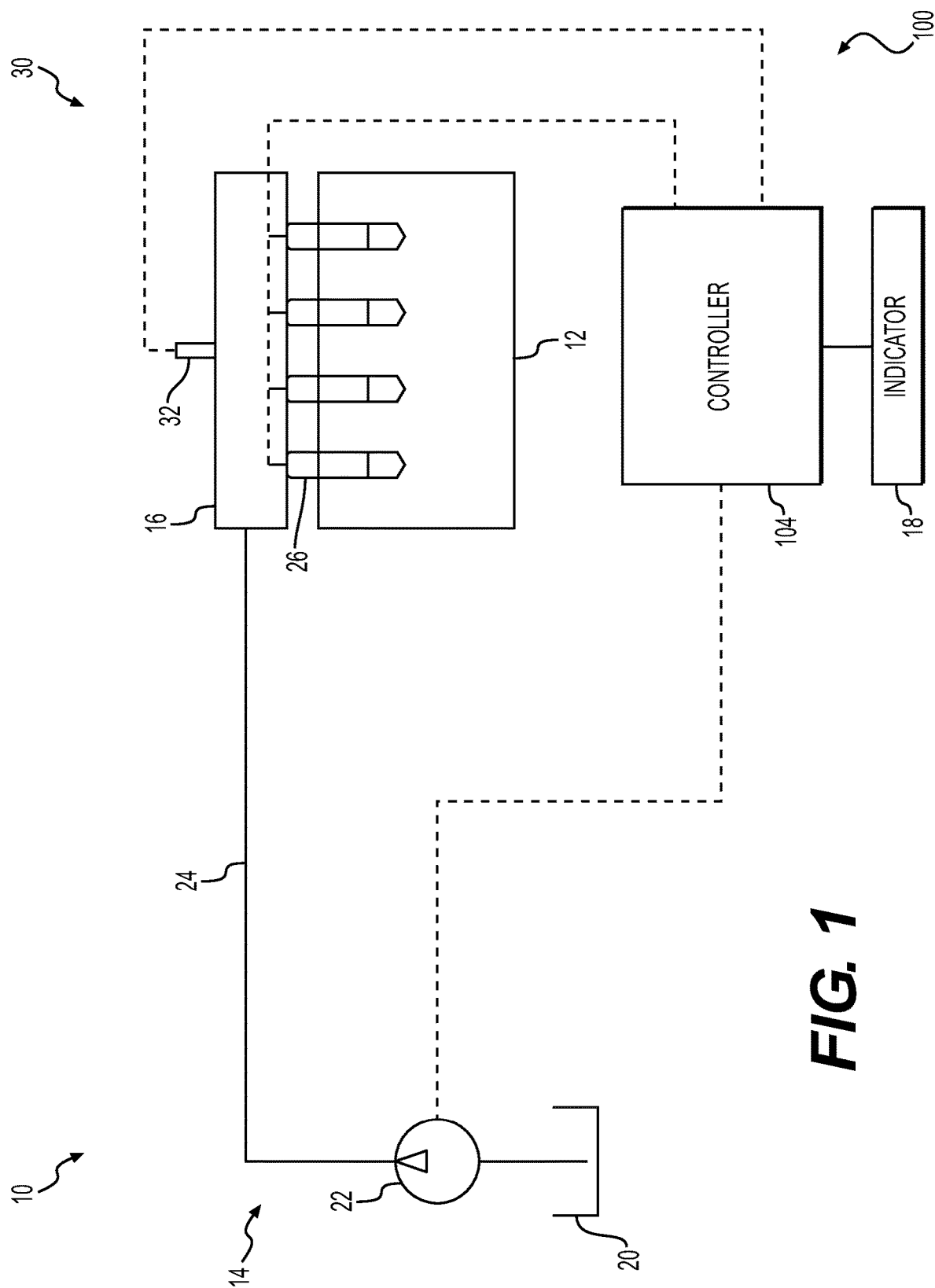
FIG. 1 is a schematic view of an engine system having a fuel leak detection system, according to aspects of the disclosure.

FIG. 1 illustrates a schematic view of an engine system 10 system having a fuel leak detection system 100. Engine system 10 includes an engine 12, such as an internal combustion engine. Engine 12 may include for example, a diesel engine, a gasoline engine, a dual fuel engine (e.g., an engine capable of running on both gaseous fuel and/or liquid fuel), or any other type of engine known in the art. Operation of engine 12 may produce power. For example, engine 12 may include one or more cylinders (not shown) and a crankshaft (not shown) for providing power to a flywheel (not shown) or the like. As shown in FIG. 1, engine system 10 also includes a fuel system 14, a common fuel rail 16, a fuel leak detection system 100, and an output indicator 18.

Fuel system 14 may include a fuel supply 20, such as a fuel tank, a pump 22, and the common fuel rail 16 in communication with each other via a fuel supply line 24. Common fuel rail 16 may be fluidly coupled to one or more fuel injectors 26 for injecting liquid fuel into the cylinders of engine 12. Pump 22 may be a high pressure pump for providing fuel from supply 20 to common fuel rail 16 at a high pressure. Pump 22 may include a mechanical pump for compressing and pressurizing fluid (e.g., fuel) to high pressures. Pump 22 may include one or more valves (not shown), such as an inlet metering valve, an outlet metering, and/or any other type of valve known in the art, for ensuring that only a desired quantity of fuel is provided to common fuel rail 16. Fuel that is not consumed by the cylinders of engine 12 may be directed back to supply 20 for being recirculated through fuel system 14. Further, fuel supply line 24 may include one or more leak paths (not shown) such that leaked fuel in fuel system 14 is directed back to supply 20 for being pumped through fuel system 14 (e.g., sent to rail 16). Fuel system 14 may also include a filter (not shown) and a low pressure pump (not shown), such as a fuel transfer pump, between the fuel supply 20 and pump 22 for generating a flow of fuel from supply 20 to pump 22. It is understood that fuel system 14 may include any number and/or combination of valves or other components known in the art.

Output indicator 18 may indicate a fuel leak in fuel system 14, as detailed below. Output indicator 18 may include a display, a gauge, a light, a speaker, or the like. For example, output indicator 18 may indicate a value (numerical value, percentage, or the like) indicative of leaked fuel in fuel system 14 and/or may indicate (e.g., via a notification) when a fuel leak exists in fuel system 14. Indicator 18 may be located in an operator cab (not shown) and/or may be located remote from engine system 10. While only a single output indicator 18 is described herein, it is understood that output indicator 18 may include one or more indicators and may include any type of indicator for indicating a fuel leak in fuel system 14.

Fuel leak detection system 100 includes a controller 104, such as an engine control module (ECM), and a sensor system 30 connected to controller 104. Sensor system 30 may include one or more sensors for measuring engine operating conditions, such as pressure sensors, flow sensors, speed sensors, or the like. For example, sensor system 30 may include a rail pressure sensor 32. Rail pressure sensor 32 may be located in common fuel rail 16 and may sense a rail pressure. It is understood that sensor 32 may include any type of sensor such as resistive sensors, inductive sensors, capacitive sensors, piezoelectric sensors, optical sensors, micro electro-mechanical system sensors, or the like. Although not shown, sensor system 30 may include other sensors for measuring engine operating conditions including, for example, flow sensors (e.g., flowmeters) for measuring a flow rate of fuel from pump 22, speed sensors (e.g., tachometers) for measuring a speed of engine 12, torque sensors for measuring a torque produced by engine 12, and/or any other sensors known in the art. Further, sensor system 30 may include any number and/or combination of sensors as necessary. Controller 104 may also be in communication with pump 22 for controlling a position of the valves of pump 22 and with injectors 26 for regulating and controlling fuel pressure in rail 16 and fuel injection into the cylinders of engine 12.

Figure 2:
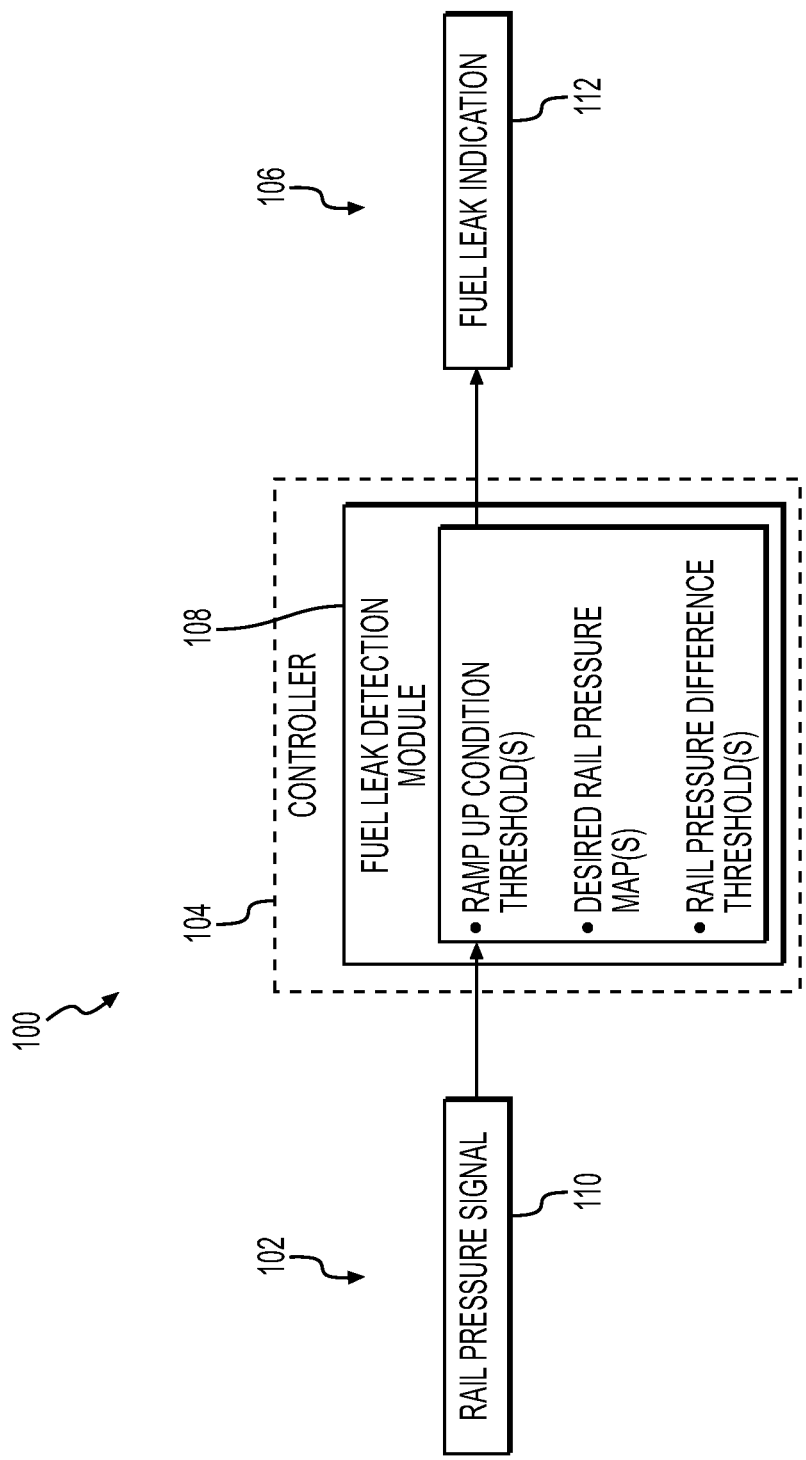
FIG. 2 is a schematic view of the exemplary fuel leak detection system for the engine system of FIG. 1.

FIG. 2 illustrates a schematic view of the exemplary fuel leak detection system 100 for operation and/or control of at least portions of engine system 10. System 100 may include inputs 102, controller 104, and outputs 106. Inputs 102 may include, for example, rail pressure signal 110 from pressure sensor 32. Outputs 106 may include, for example, a fuel leak indication signal 112. Controller 104 also includes a fuel leak detection module 108. Fuel leak detection module 108 may receive inputs 102, implement a method 300 for detecting a fuel leak in fuel system 14 and control outputs 106, as described with reference to FIG. 3 below.

Controller 104 may embody a single microprocessor or multiple microprocessors that may include means for detecting a fuel leak in fuel system 14 for engine system 10. For example, controller 104 may include a memory, a secondary storage device, and a processor, such as a central processing unit or any other means for accomplishing a task consistent with the present disclosure. The memory or secondary storage device associated with controller 104 may store data and/or software routines that may assist controller 104 in performing its functions, such as the functions of method 300 of FIG. 3. Further, the memory or secondary storage device associated with controller 104 may also store data received from the various inputs 102 associated with fuel leak detection system 100. Numerous commercially available microprocessors can be configured to perform the functions of controller 104. It should be appreciated that controller 104 could readily embody a general machine controller capable of controlling numerous other machine functions. Further, controller 104, or portions thereof, may be located remote from engine system 10. Various other known circuits may be associated with controller 104, including signal-conditioning circuitry, communication circuitry, hydraulic or other actuation circuitry, and other appropriate circuitry.

Controller 104 may also include stored values for use by module 108. For example, the stored values may include ramp up condition thresholds, desired rail pressure maps, and rail pressure difference thresholds. Ramp up condition thresholds may include one or more thresholds for various operating conditions of engine system 10 that indicate ramp up for engine system 10. As used herein, "ramp up" is a change and/or increase in engine operating conditions from an idle condition to a steady state condition (e.g., to a desired value for a respective operating condition. In other words, a ramp up may include a transient condition of the operating conditions. For example, the ramp up condition threshold may include a threshold for rail pressure (e.g., 50 MPa) such that ramp up exists when the rail pressure increases above the threshold from the idle condition to steady state (e.g., to a final desired rail pressure for given operating conditions). Thus, the ramp up may include the increase between the threshold and the desired rail pressure at steady state. The idle condition exists when the engine operating conditions are below their respective ramp up thresholds for a predetermined amount of time. For example, the idle condition may exists when rail pressure is less than 50 MPa for the predetermined amount of time. The ramp up condition thresholds and idle condition thresholds may also include thresholds for engine speed, engine load, idle time, pump flow rate, or any other parameters indicative of engine operating conditions. As used herein, "engine load" may be a capacity of engine system 10 to produce power (e.g., torque) in relation to a rated or maximum load at various speeds of engine system 10. Controller 104 may determine or derive engine load from various inputs including, for example, intake manifold pressure, torque produced by engine system 10, speed of engine system 10, amount of liquid fuel injected to cylinders of engine 12, or any other input. When a respective engine operating condition parameter exceeds the respective ramp up condition threshold from an idle condition, module 108 may determine that a ramp up condition exists, as detailed further below. Further, it is understood that module 108 may utilize a ramp up threshold for a single parameter (e.g., rail pressure), and/or may utilize multiple (e.g., more than one) ramp up thresholds for various parameters in combination.

The desired rail pressure maps may provide predetermined, expected, or required values of rail pressure for various operating conditions of engine system 10. The maps, or look-up tables, may plot two or more operating conditions to provide an output of the desired rail pressure for the respective operating conditions. For example, the desired rail pressure maps may provide the desired rail pressure based on engine speed, engine load, fuel rate, or any other engine operating condition. The information used to derive the values of the maps or look-up tables may be determined by empirical analysis. Such empirical data may be obtained, for example, by operating a test engine system 10 under predetermined conditions (e.g., under particular operating conditions) during, for example, bench testing. For example, the desired rail pressure values may be correlated to the values of the engine operating conditions. It is understood that the map or lookup table may provide the values of desired rail pressure as a function of any type of input as desired. Further, the desired rail pressure maps may provide an expected rate of increase of the rail pressure to reach a desired rail pressure. For example, during ramp up, the desired rail pressure may increase to a desired rail pressure for steady state at an expected rate of increase, as detailed further below.

The rail pressure difference thresholds may include one or more thresholds for a difference between measured or actual rail pressure and the desired rail pressure during ramp up that indicates a fuel leak in fuel system 14. For example, a time lag may exist between the desired rail pressure and the measured or actual rail pressure during the ramp up event until the actual rail pressure is substantially equal to the desired rail pressure at a steady state condition (e.g., when actual rail pressure reaches the desired rail pressure for a predetermined amount of time). The time lag may exist due to a delay in the pump 22 pumping fuel to rail 16 as the injectors 26 inject fuel from the rail 16 to meet the desired rail pressure when there is a demand on the engine system 10. For example, pump 22 may pump fuel to rail 16 to maintain the actual rail pressure at the desired rail pressure during steady state. Accordingly, when there is a demand on the engine system 10, such as when an operator actuates an accelerator, the desired rail pressure may immediately increase to the desired rail pressure for the given operating conditions and the pump 22 may pump fuel to the rail 16 to meet the desired rail pressure for that demand as the injectors 26 are injecting fuel from rail 16 to the cylinders of engine 12. The delay may exist due to the time it takes for the pump 22 to pump the fuel and pressurize the rail 16 in response to the demand. However, if there is a fuel leak in the fuel system 14, the time lag may be larger than an expected time lag for a given demand, or increase in desired rail pressure. Thus, a fuel leak may exist in fuel system 14 if the difference between the measured or actual rail pressure and the desired rail pressure during ramp up is greater than the one or more rail pressure difference thresholds. Further, the rail pressure difference thresholds may depend on a given engine platform (e.g., type of engine) and engine operation type (e.g., constant speed engine, variable speed engine, load and speed profiles for a given engine). The rail pressure difference thresholds may provide a single, static value (e.g., 10 MPa) for a given application and/or may provide variable values based on operating conditions and/or various types of ramp up profiles for different demands of engine system 10 (e.g., a first value for a first set of operating conditions, and a second value for a second, different set of operating conditions).

Rail pressure difference thresholds may also provide other values that indicate a fuel leak in fuel system 14. For example, rail pressure difference thresholds may provide a rate of increase or a time threshold for the measured or actual rail pressure to meet, or substantially equal, the desired rail pressure at steady state (e.g., at the desired rail pressure), or for the measured or actual rail pressure to reach steady state after the ramp up condition. For example, when there is no leak, or a negligible leak in fuel system 14, the measured or actual rail pressure may reach steady state and/or may substantially equal the desired rail pressure after a relatively short amount of time. When there is a leak in fuel system 14, the rate of increase of the measured or actual rail pressure will be less than an expected rate of increase, such that the time of the measured or actual rail pressure to meet the desired rail pressure at steady state is greater than the time threshold (e.g., an expected time). It is understood that the rail pressure difference thresholds may include any other values or thresholds of the difference that indicate a fuel leak in fuel system 14.

Fuel leak indication signal 112 may include control of aspects of engine system 10. For example, fuel leak indication signal 112 may include controller 104 outputting a signal to display a value indicative of a fuel leak in fuel system 14 on output indicator 18 (e.g., on a display). Fuel leak indication signal 112 may also include controller 104 outputting an alert, such as a light, an audible alert, an alert on a display, or the like when there is a fuel leak in fuel system 14. The fuel leak indication signal 112 may also include mitigation or remediation recommendations. For example, module 108 may recommend service intervals, fuel system tests, and/or any other maintenance techniques for locating, mitigating, and/or remediating the fuel leak in fuel system 14. Fuel leak indication signal 112 may also include controller 104 adjusting the engine system 10. For example, controller 104 may derate or shut down engine system 10 or portions thereof.

INDUSTRIAL APPLICABILITY

The disclosed aspects of the fuel leak detection system 100 of the present disclosure may be used in any engine system 10 having a pump 22.

Referring to FIG. 1, during the operation of engine system 10, pump 22 of fuel system 14 may draw fuel from fuel supply 20. Pump 22 may thus provide pressurized fuel out of pump 22 to rail 16 through supply line 24. The pressurized fuel may be maintained at a pressure in the rail 16 by pump 22, as detailed above. The pressurized fuel may then be injected through injectors 26 into the cylinders of engine 12, and combustion of the fuel (and air) in the cylinders may cause rotation of the crankshaft to provide useful mechanical power. In some instances, a fuel leak may occur in fuel system 14. For example, mechanical joints between the rail 16, supply line 24, and/or injectors 26 may wear and fuel may leak past the mechanical joints. As described above, the leaked fuel of fuel system 14 may be directed back to supply 20 such that the leaked fuel is drawn from supply 20 by pump 22. Thus, the leaked fuel is recirculated through fuel system 14 to rail 16 and, thus to injectors 26. Further, pump 22 may pressurize the rail 16 to the desired rail pressure at a steady state condition. In such instances, the measured or actual rail pressure may be substantially equal to the desired rail pressure during the steady state condition due to pump 22 being controlled to meet desired rail pressure during the steady state condition. Therefore, a leak may not be adequately detected during steady state conditions. Thus, as detailed below with reference to FIG. 3, fuel leak detection system 100 may detect fuel leaks in fuel system 14 during a ramp up of engine system 10.

Figure 3:
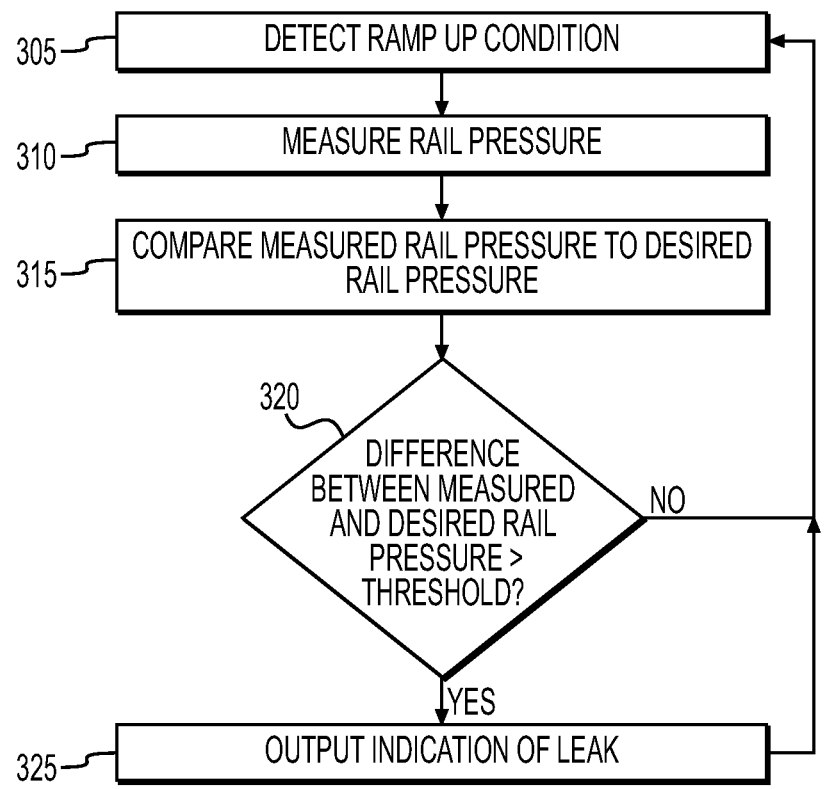
FIG. 3 provides a flowchart depicting an exemplary method for detecting a fuel leak for the system of FIG. 1.

FIG. 3 illustrates a flowchart depicting an exemplary method 300 for detecting a fuel leak in fuel system 14 for engine system 10. In step 305, module 108 may detect a ramp up condition of engine system 10. For example, module 108 may measure rail pressure of rail 16 and detect the ramp up when the measured rail pressure and/or the desired rail pressure exceeds a threshold (e.g., 50 mPa) from an idle condition. As detailed above, module 108 may utilize other operating condition parameters and respective ramp up thresholds. For example, module 108 may determine a ramp up based on one or more of engine speed (e.g., greater than 1,000 RPM), engine load (e.g., greater than 20%), and/or any other operating condition parameters, or combinations thereof, increasing from an idle condition and exceeding a respective ramp up threshold. In accordance with a determination that a respective operating condition exceeds the respective ramp up threshold from the idle condition, module 108 may determine a ramp up of engine system 10. It is understood that module 108 may detect a ramp up condition of engine system 10 by any other method known in the art.

In step 310, when module 108 has detected a ramp up condition of engine system 10, module 108 may measure rail pressure of rail 16 during the ramp up. For example, controller 104 may receive the rail pressure signal 110 and determine, or otherwise derive, the rail pressure of rail 16. Module 108 may also determine a rate of rail pressure change over time based on the rail pressure signal 110.

In step 315, module 108 may compare the measured rail pressure to the desired rail pressure. As detailed above, module 108 may determine the desired rail pressure from the desired rail pressure maps. For example, module 108 may determine the desired rail pressure for a given demand of engine system 10 based on one or more operating conditions.

In step 320, module 108 may determine whether a difference between the measured rail pressure of rail 16 and the desired rail pressure is greater than a threshold during the ramp up. For example, when there is no leak, or a negligible leak, and the engine system 10 ramps up, the rail pressure of rail 16 correspondingly increases to the desired rail pressure at steady state (e.g., to a desired rail pressure of given operating conditions) and/or at an expected or desired rail pressure rate based on the operating conditions during the ramp up. In other words, the rail pressure of rail 16 will increase to the desired rail pressure at steady state in an expected or desired amount of time. Thus, when the difference between the measured rail pressure of rail 16 and the desired rail pressure is less than or equal to the threshold (Step 320: NO), module 108 may repeat the method 300 and continue to detect ramp up conditions (step 305).

When there is a fuel leak in fuel system 14, the rail pressure of rail 16 may not correspondingly increase to the desired rail pressure and/or at the desired rail pressure rate based on the operating conditions during the ramp up. In other words, the rail pressure of rail 16 will increase to the desired rail pressure or steady state in a greater amount of time than the expected amount of time. Thus, in step 325, in accordance with a determination that the difference between the measured rail pressure of rail 16 and the desired rail pressure is greater than the threshold (Step 320: YES), module 108 may output an indication of a fuel leak in fuel system 14. For example, module 108 may display the indication of the fuel leak on output indicator 18 (e.g., on a display and/or as a notification, such as a light, an audible alert, an alert on a display, etc.). Module 108 may then repeat the method 300 and continue to detect ramp up conditions (step 305).

In some embodiments, module 108 may store values or instances of the difference between the measured rail pressure and the desired rail pressure. For example, module 108 may detect several different ramp up events and store values of the difference for the different ramp up events. Thus, module 108 may generate a distribution of the differences for the different ramp events over time. For example, the distribution may include a graphical representation of the values of the difference for each of the different ramp up events. From the distribution, module 108 may determine a mean value of the values of the differences for the different ramp up events. If the mean value is greater than the rail pressure difference threshold, module 108 may determine a fuel leak in fuel system 14 exists and output an indication of the fuel leak, as detailed above. Thus, false negatives and false positives of leak detection may be reduced or otherwise eliminated by tracking the difference over multiple ramp up events.

Fuel leak detection system 100 may provide an indication of a fuel leak in fuel system 14. For example, fuel leak detection system 100 may detect fuel leaks in pump 22, supply line 24, rail 16, injectors 26, and/or any other components of fuel system 14. Further, by detecting leaks during ramp up events, fuel leak detection system 100 may detect moderate or relatively small fuel leaks. Thus, fuel leak detection system 100 may detect fuel leaks even if the fuel system 14 is designed to ensure that the measured rail pressure reaches (e.g., is substantially equal to) the desired rail pressure during steady state (e.g., reaches the desired rail pressure). Accordingly, fuel leak detection system 100 may more accurately or adequately detect fuel leaks in fuel system 14 and proactively alert a user (e.g., operator, technician, etc.) so that the user may repair and/or replace the respective component to mitigate the fuel leak.

It will be apparent to those skilled in the art that various modifications and variations can be made to the disclosed system without departing from the scope of the disclosure. Other embodiments of the system will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A method for detecting a fuel leak for a fuel system of an engine, comprising:
   detecting a ramp up of the engine when the rail pressure exceeds a threshold from an idle condition;
   measuring rail pressure of a fuel rail during the ramp up;
   determining a fuel leak exists in the fuel system based on the measured rail pressure during the ramp up; and
   in accordance with a determination that a fuel leak exists, outputting an indication of the fuel leak in the fuel system.

2. The method of claim 1, wherein the detecting the ramp up further includes detecting the ramp up when one or more of an engine speed, an engine load, or a pump flow rate exceeds a threshold from an idle condition.

3. The method of claim 1, wherein the determining a fuel leak exists includes:

determining if an amount of time the measured rail pressure takes to reach steady state is greater than an expected amount of time to reach steady state; and in accordance with a determination that the amount of time to reach steady state is greater than the expected amount of time, determining a fuel leak exists.

4. The method of claim 1, further including:
determining a fuel leak exists based on the measured rail pressure during a plurality of ramp ups.

5. The method of claim 1, wherein the determining a fuel leak exists includes:
comparing the measured rail pressure during the ramp up to a desired rail pressure;
determining whether a difference between the measured rail pressure and the desired rail pressure is greater than a threshold; and
in accordance with a determination that the difference is greater than the threshold, determining a fuel leak exists.

6. The method of claim 5, further including:
detecting a plurality of ramp ups of the engine;
storing a value of the difference between the measured rail pressure and the desired rail pressure for each of the plurality of ramp ups; and
determining a fuel leak exists when a mean value of the value of the difference for each of the plurality of ramp ups is greater than a threshold.

7. The method of claim 1, wherein the outputting an indication of the fuel leak includes:
generating recommendations for mitigating the fuel leak; and
outputting the recommendations.

8. A fuel leak detection system, comprising:
a fuel system of an engine including a fuel rail;
a sensor for measuring a rail pressure of the fuel rail; and
a controller configured to:
detect a ramp up of the engine;
measure the rail pressure of the fuel rail during the ramp up;
determine a fuel leak exists in the fuel system based on the measured rail pressure during the ramp up; and
in accordance with a determination that a fuel leak exists, outputting an indication of the fuel leak in the fuel system;
wherein the determining a fuel leak exists includes the controller configured to: determine if an amount of time the measured rail pressure takes to reach steady state is greater than an expected amount of time to reach steady state; and in accordance with a determination that the amount of time to reach steady state is greater than the expected amount of time, determine a fuel leak exists.

9. The system of claim 8, wherein the detecting the ramp up includes the controller configured to detect the ramp up when the rail pressure exceeds a threshold from an idle condition.

10. The system of claim 9, wherein the detecting the ramp up includes the controller further configured to detect the ramp up when one or more of an engine speed, an engine load, or a pump flow rate exceeds a threshold from an idle condition.

11. The system of claim 8, wherein the controller is further configured to:
determine a fuel leak exists based on the measured rail pressure during a plurality of ramp ups.

12. The system of claim 8, wherein the determining a fuel leak exists includes the controller configured to:
compare the measured rail pressure during the ramp up to a desired rail pressure;
determine whether a difference between the measured rail pressure and the desired rail pressure is greater than a threshold; and
in accordance with a determination that the difference is greater than the threshold, determine a fuel leak exists.

13. The system of claim 12, wherein the controller is further configured to:
detect a plurality of ramp ups of the engine;
store a value of the difference between the measured rail pressure and the desired rail pressure for each of the plurality of ramp ups; and
determine a fuel leak exists when a mean value of the value of the difference for each of the plurality of ramp ups is greater than a threshold.

14. The system of claim 8, wherein the outputting an indication of the fuel leak includes the controller configured to:
generate recommendations for mitigating the fuel leak; and
output the recommendations.

15. A method for detecting a fuel leak for a fuel system of an engine, comprising:
detecting a ramp up of the engine when a rail pressure of a fuel rail exceeds a threshold from an idle condition;
measuring rail pressure of the fuel rail during the ramp up;
comparing the measured rail pressure during the ramp up to a desired rail pressure;
determining whether a difference between the measured rail pressure and the desired rail pressure is greater than a threshold;
in accordance with a determination that the difference is greater than the threshold, determining a fuel leak in the fuel system exists; and
outputting an indication of the fuel leak in the fuel system.

16. The method of claim 15, further including:
determining a fuel leak exists based on the measured rail pressure during a plurality of ramp ups.

17. The method of claim 15, further including:
detecting a plurality of ramp ups of the engine;
storing a value of the difference between the measured rail pressure and the desired rail pressure for each of the plurality of ramp ups; and
determining a fuel leak exists when a mean value of the value of the difference for each of the plurality of ramp ups is greater than a threshold.

18. The method of claim 15, wherein the outputting an indication of the fuel leak includes:
generating recommendations for mitigating the fuel leak; and
outputting the recommendations.

* * * * *